United States Patent
Haag et al.

(10) Patent No.: US 10,928,571 B2
(45) Date of Patent: Feb. 23, 2021

(54) MULTILAYER REFLECTIVE POLARIZER WITH EMBEDDED ABSORBING ELEMENTS

(71) Applicant: 3M INNOVATIVE PROPERTIES COMPANY, St. Paul, MN (US)

(72) Inventors: Adam D. Haag, Woodbury, MN (US); Timothy J. Nevitt, Red Wing, MN (US); Quinn D. Sanford, Ellsworth, WI (US); Robert D. Taylor, Stacy, MN (US); Carl A. Stover, Saint Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/102,117

(22) PCT Filed: Dec. 4, 2014

(86) PCT No.: PCT/US2014/068656
§ 371 (c)(1),
(2) Date: Jun. 6, 2016

(87) PCT Pub. No.: WO2015/085114
PCT Pub. Date: Jun. 11, 2015

(65) Prior Publication Data
US 2016/0306086 A1  Oct. 20, 2016

Related U.S. Application Data

(60) Provisional application No. 61/913,001, filed on Dec. 6, 2013.

(51) Int. Cl.
*G02B 5/30* (2006.01)
*F21V 9/14* (2006.01)

(52) U.S. Cl.
CPC .............. *G02B 5/3041* (2013.01); *F21V 9/14* (2013.01); *G02B 5/305* (2013.01); *G02B 5/3083* (2013.01)

(58) Field of Classification Search
CPC .... G02B 5/3041; G02B 5/305; G02B 5/3083; G02B 5/3066; G02B 5/3025; F21V 9/14
USPC ............ 359/485.01, 485.03, 487.01, 487.02, 359/489.01, 489.11, 489.12, 485.13; 428/1.31
See application file for complete search history.

(56) References Cited

U.S. PATENT DOCUMENTS 6,096,375 A     8/2000  Ouderkirk
6,451,414 B1 *  9/2002  Wheatley .......... B32B 17/10018
                                                          359/359

(Continued)

FOREIGN PATENT DOCUMENTS

CN   101542198 A    9/2009
JP   2008-102183 A  5/2008

(Continued)

OTHER PUBLICATIONS

International Search Report for PCT International Application No. PCT/US2014/068656 dated Mar. 3, 2015, 3 pages.

*Primary Examiner* — Marin Pichler
(74) *Attorney, Agent, or Firm* — Michael Stern

(57) ABSTRACT

Hybrid polarizers are described. More particularly, hybrid polarizers including reflective polarizer portions and hybrid polarizing portions, including embedded absorbing polarizing elements are described. The hybrid polarizers may be used in backlights or display devices.

8 Claims, 2 Drawing Sheets

(56) References Cited

U.S. PATENT DOCUMENTS

| | | |
|---|---|---|
| 7,826,009 B2 | 11/2010 | Weber |
| 2008/0151147 A1 | 6/2008 | Weber |
| 2008/0151371 A1 | 6/2008 | Weber |
| 2011/0272849 A1 | 11/2011 | Neavin |

FOREIGN PATENT DOCUMENTS

| | | |
|---|---|---|
| WO | WO 95/17303 A1 | 6/1995 |
| WO | WO 97/01440 A1 | 1/1997 |
| WO | WO 1999-36813 | 7/1999 |
| WO | WO 2010-075363 | 7/2010 |
| WO | WO 2014-130283 | 8/2014 |

* cited by examiner

MULTILAYER REFLECTIVE POLARIZER WITH EMBEDDED ABSORBING ELEMENTS

CROSS REFERENCE TO RELATED APPLICATIONS

This application is a national stage filing under 35 U.S.C. 371 of PCT/US2014/068656, filed Dec. 4, 2014, which claims the benefit of U.S. Provisional Application No. 61/913,001, filed Dec. 6, 2013, the disclosure of which is incorporated by reference in their entirety herein.

BACKGROUND

Multilayer optical films, which include co-extruded and stretched alternating thermoplastic birefringent layers, are useful as reflective polarizers and mirrors. Conventional backlight stacks, including those found in liquid crystal displays, may include one or more absorbing polarizers—which generally may be polymeric (such as polyvinyl alcohol) bodies including absorbing polarizing dyes—as an antireflection layer.

SUMMARY

In one aspect, the present disclosure relates to a hybrid polarizer. More particularly, the present disclosure relates to hybrid polarizers having a reflective polarizer portion and a hybrid portion. The reflective polarizer portion includes alternating high index layers and low index layers, where the reflective polarizer portion is substantially free of absorbing polarizer elements. The hybrid polarizer portion is disposed on the reflective polarizer portion and includes alternating high index layers and low index layers, where at least some of the high index layers of the hybrid polarizer portion include absorbing polarizer elements.

In some embodiments, each of the high index layers of the hybrid polarizer portion includes absorbing polarizer elements. In some embodiments, the absorbing polarizing elements are dyes. The dyes may be polarizing dyes. In some embodiments, the hybrid polarizer further includes an absorbing polarizer disposed on the hybrid polarizer portion. In some embodiments, the hybrid polarizer further includes a quarter-wave plate disposed on either the hybrid polarizer portion or the reflective polarizer portion. In some embodiments, the reflective polarizer portion and the hybrid polarizer portion have substantially equal thicknesses. In some embodiments, the hybrid polarizer contains no layer thicker than 200 nm. The reflective polarizer portion and the hybrid polarizer portion may be separate packets. In some embodiments, the reflective polarizer portion and the hybrid polarizer portion are separated by a protective boundary layer. The reflective polarizer portion and the hybrid polarizer portion may include thermoplastic layers.

In another aspect, the present disclosure relates to a hybrid polarizer. More particularly, the present disclosure relates to hybrid polarizers having a reflective polarizer portion, an absorbing polarizer, and a hybrid polarizer portion. The reflective polarizer portion includes alternating high index layers and low index layers, where the reflective polarizer portion is substantially free of absorbing polarizer elements. The absorbing polarizer is disposed on the reflective polarizer portion. The hybrid polarizer portion is disposed on the absorbing polarizer and includes alternating high index layers and low index layers, where at least some of the high index layers of the hybrid polarizer portion include absorbing polarizer elements.

In some embodiments, the hybrid polarizers may be included in a backlight having a viewing area. The hybrid polarizer is disposed such that the hybrid polarizer is closer to the viewing area than the reflective polarizer portion.

DETAILED DESCRIPTION

Hybrid polarizers may be used in several types of display devices, such as liquid crystal display devices (LCDs) and organic light emitting diode (OLED) based displays. They can function as a replacement for high performance absorbing polarizers on either the viewer side or the rear side of a display panel. "Hybrid" refers to the polarizer's functionality including elements from each of reflecting and absorbing polarizers. Because these functions may be combined into a single construction, hybrid polarizers may result in thinner optical stacks, backlights, and displays than would otherwise be required with separate reflective polarizing and absorptive polarizing elements. Hybrid polarizers may function not only as providing contrast to a display panel, but also providing polarization recycling for brightness enhancement.

Figure 1:
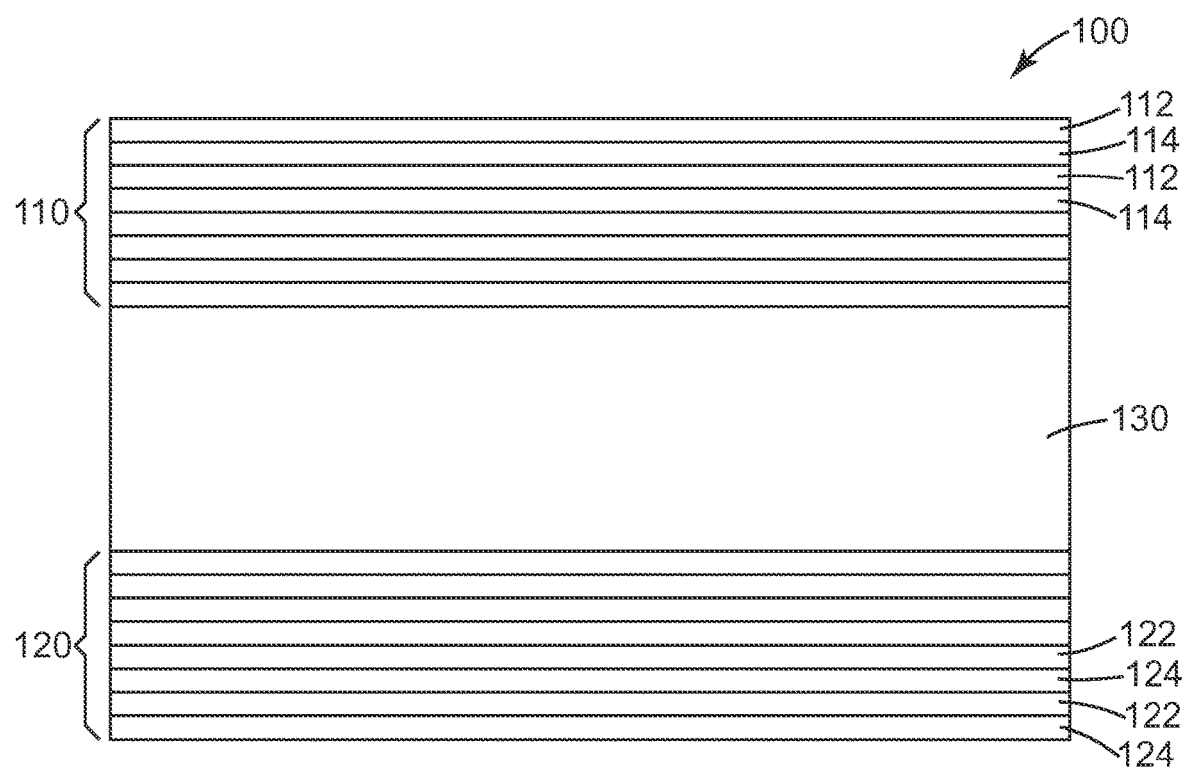
FIG. 1 is a cross sectional elevation view of a prior art hybrid polarizer.

Certain hybrid polarizers have previously been described in, for example, U.S. Pat. No. 7,826,009 (Weber et al.). These hybrid polarizers include an absorbing element having a first major surface and a second major surface, a first reflective polarizer disposed on the first major surface of the absorbing element, and a second reflective polarizer disposed on the second major surface of the absorbing element. The basic construction of one embodiment of the hybrid polarizer described in Weber et al. is shown in FIG. 1. FIG. 1 is a cross sectional elevation view of prior art hybrid polarizer 100, which includes first reflective polarizer 110 having alternating layers of high index layer 112 and low index layer 114, second reflective polarizer 120 having alternating layers of high index layer 122 and low index layer 124, and absorbing element 130. Note that for a reflective polarizer having birefringent layers such as those described in this disclosure, "high index" and "low index" layer refer to the different in refractive index along one of the in-plane axes, because in many cases the other in-plane refractive index will be the same or similar between the layers. Absorbing element may be an absorbing polarizer, including an absorbing polarizer such as a polyvinyl alcohol film including absorbing dyes.

Because of the inclusion of the absorbing element, prior art hybrid polarizer 100 may be thicker than desired. Further, the absorbing element may not be possible to assemble or orient in the same manufacturing process as the reflective polarizers, requiring one or more lamination steps.

Figure 2:
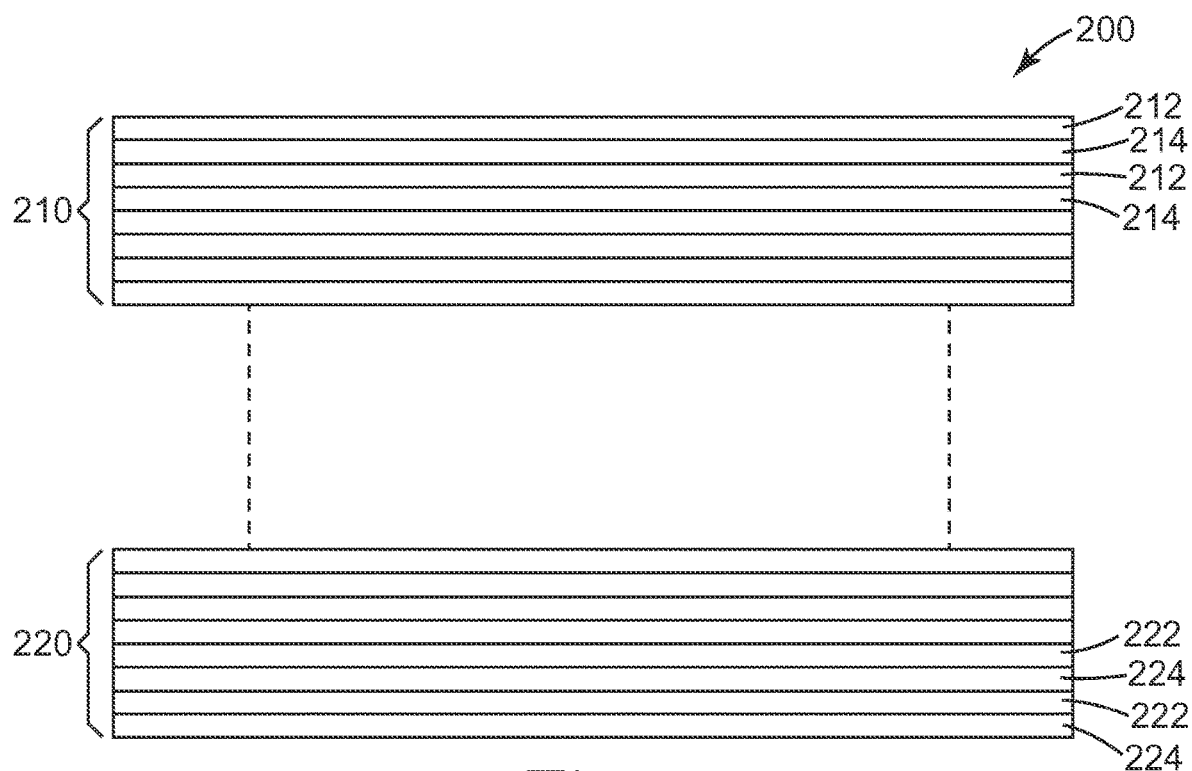
FIG. 2 is an exploded cross sectional elevation view of a hybrid polarizer.

FIG. 2 is an exploded cross sectional elevation view of a hybrid polarizer of the present disclosure. Hybrid polarizer 200 includes hybrid polarizer portion 210 and reflective polarizer portion 220. Hybrid polarizer portion 210 has alternating layers of high index layer 212 and low index layer 214. Reflective polarizer portion 220 has alternating layers of high index layer 222 and low index layer 222.

Hybrid polarizer portion 210 may be a multilayer reflective polarizer. In some embodiments, the multilayer reflective polarizer includes thermoplastic birefringent layers. Within hybrid polarizer portion 210, at least some instances of high index layer 212 may include absorbing polarizing elements. These absorbing polarizing elements may be any suitable material that absorbs light of one polarization in favor of light having another polarization. In some cases these materials may be referred to as dichroic. In some embodiment, these absorbing polarizing elements may be dyes, including, for example, dichroic dyes. In some cases, all of the instances of high index layer 212 may include absorbing polarizing elements. In some embodiments, the dyes or absorbing polarizing elements may be orientable, that is, when stretched, the absorbing polarizing elements may preferentially absorb polarizations that are parallel to the stretch direction. If the layers include orientable thermoplastic layers, the thermoplastic layers may be oriented (i.e., stretched) in the same step as orienting the absorbing polarizing elements. Depending on whether the materials of the thermoplastic layers are positively or negatively birefringent; that is, whether the index of refraction increases or decreases along the stretch direction, the block axis attributed to the birefringence in the alternating layers may be parallel or perpendicular to the block axis attributed to the absorbing polarizing elements. Low index layer 214 is instead substantially free of absorbing polarizing elements. Hybrid polarizer portion 210 both reflects certain polarizations of light due to its in-plane refractive index differences and absorbs certain polarizations of light due to its absorbing polarizing elements.

Reflective polarizer portion 220 may also be a multilayer reflective polarizer. The high index and low index layers of reflective polarizer portion 220 are substantially free of any absorbing polarizing elements. In some embodiments, reflective polarizer portion 220 may be in many aspects substantially the same film or have substantially the same properties as hybrid polarizer portion 210. For example, reflective polarizer portion 220 and hybrid polarizer portion 210 may have the same or similar layer counts, total thicknesses, layer thickness profiles, and may use similar material sets. Because hybrid polarizer portion 210 contains absorbing polarizing elements, however, hybrid polarizer portion 210 and reflective polarizer portion 220 will never be absolutely identical. In some embodiments, the layer count, layer thickness profiles, packet number and configuration, and material sets may be different between the hybrid polarizer portion and reflective polarizer portion. In some embodiments, the layer profiles of each packet may be specifically designed to optimize collimation or otherwise selectively reflect high angle light preferentially transmit light within a desired angular range.

Hybrid polarizer portion 210 is disposed on reflective polarizer portion 220. In some embodiments, hybrid polarizer portion 210 is laminated or adhered to reflective polarizer portion by any suitable attachment method, including optically clear adhesives, pressure sensitive adhesives, or the like. Any adhesive may in some embodiments have an index of refraction close to that of adjacent layers of both the hybrid polarizer portion 210 and reflective polarizer portion 220 to avoid or minimize refractive or Fresnel reflection effects. In some embodiments hybrid polarizer portion 210 and reflective polarizer portion 220 are optically coupled. In some embodiments, hybrid polarizer portion 210 is coextruded with reflective polarizer portion 220, and hybrid polarizer portion 210 and reflective polarizer portion 220 may be separated by a thicker non-optical layer, such as a protective boundary layer (PBL). In some embodiments, hybrid polarizer portion 210 and reflective polarizer portion 220 are separated by a thick or dimensionally stable layer to improve warp resistance or other physical characteristics.

In some embodiments, an absorbing polarizer layer may be included in the hybrid polarizer. For example, an absorbing polarizer layer may be included between hybrid polarizer portion 210 and reflective polarizer portion 220. In some embodiments, particularly in applications with OLEDs which emit circularly polarized light, a quarter-wave plate may be attached or disposed on either the top or bottom surface of hybrid polarizer 200, or in some cases both. In some embodiments, an absorbing polarizer may be attached or disposed on either the top or bottom surface of hybrid polarizer 200, or in some cases both.

U.S. Pat. No. 6,096,375 (Ouderkirk et al.) describes incorporating a dichroic polarizer with a reflective polarizer by adding dichroic dyestuff in the skin layers of a multilayer reflective polarizer or by adding dye to one or more layers in the multilayer stack. However, Ouderkirk does not describe either selectively including absorbing polarizing elements in the high index layers, nor a hybrid polarizer portion and a reflective polarizer portion, where the reflective polarizer portion is substantially free of absorbing polarizing elements.

Hybrid polarizers of the present disclosure may be combined with any suitable optical elements or set of optical elements including but not limited to specular, semi-specular, or diffuse reflectors, liquid crystal modules, reflective polarizers (including multilayer reflective polarizers), mirrors and multilayer mirrors, turning films, prism films and other brightness enhancing films, diffusers included beaded and volume diffusers, one or more lightguides, graphics, retroreflective layers, or suitable optical coatings.

EXAMPLES

Materials

| Abbreviation/product name | Description | Available from |
| --- | --- | --- |
| PD-325H | Dichroic dye | Mitsui Fine Chemical, Japan |
| PD-335H | Dichroic dye | Mitsui Fine Chemical, Japan |
| PD-104 | Dichroic dye | Mitsui Fine Chemical, Japan |
| PD-318H | Dichroic dye | Mitsui Fine Chemical, Japan |
| OCA 8171 | Optically clear adhesive | 3M Company, St. Paul, MN |
| APF | Advanced Polarizer Film | 3M Company, St Paul, MN |
| Sanritz-5618 | Linear absorbing polarizer available under the trade name HLC2-5618 | Sanritz Corporation, Tokyo, Japan. |
| GN071 PETg | PETg | Eastman Chemical, Kingsport, TN |

Comparative Example C1

A hybrid polarizer similar to that in FIG. 1, but with an absorbing layer on the outer surface in addition to absorbing layer 130, was manufactured using the feedblock method described in U.S. Patent Application Publication No. 2011/0272849 entitled "Feedblock for Manufacturing Multilayer Polymeric Films", filed May 7, 2010 and incorporated by reference herein. Two packets of alternating low and high index polymer layers were coextruded as a cast web and then stretched in a tenter on a continuous film making line. The first packet and the second packet were each a stack of 275 layers where the high index layer was constrained uniaxial PEN (polyethylene naphthalate) and the low index layer was CoPEN 55/45 (a copolymer comprising 55% PEN units and 45% polyethylene teraphthalate (PET) units) and GN071 PETg at 50% each. The packets were designed so that each of the first and second packets was a reflective polarizer. Absorbing polarizer layers were coextruded on the outer surface of the first packet and in between the first and second packets with the following method. PEN pellets were fed into a twin screw extruder at a rate of 58 kg/hr (128 pounds per hour (pph)). Dichroic dyes were also fed into the twin screw extruder at the following rates: PD-104: 95.3 g/hr (0.21 pph), PD-325H: 162.4 g/hr (0.36 pph), PD-335H: 64.6 g/hr (0.14 pph), and PD-318H: 209 g/hr (0.46 pph). This mixture was fed through a 41 cm (16 inch) die along with the multilayer packets to form a cast sheet at a speed of 6.1 m/min (20 feet per minute). The cast sheet was stretched in a tenter at a ratio of 5.6:1 at a temperature of 148° C. (299° F.) with a speed of 6.1 m/min (20 feet per minute).

Comparative Example C2

Comparative Example C2 was prepared as in Comparative Example C1, except that the flow rates of all dichroic dyes were increased by 50%.

Comparative Example C3

A hybrid polarizer was manufactured using the feedblock method described in U.S. Patent Application Publication No. 2011/0272849 entitled "Feedblock for Manufacturing Multilayer Polymeric Films", filed May 7, 2010. Two packets of alternating low and high index polymer layers were coextruded as a cast web and then stretched in a tenter on a continuous film making line. The first packet and the second packet were each a stack of 275 layers where the high index layer was constrained uniaxial PEN fed into the twin screw extruder at a rate of 58 kg/hr (128 pph) with dichroic dyes fed at the following rates: PD-104: 95.3 g/hr (0.21 pph), PD-325H: 162.4 g/hr (0.36 pph), PD-335H: 64.6 g/hr (0.14 pph), and PD-318H: 209 g/hr (0.46 pph). The low index layer was a mixture of CoPEN 55/45 and GN071 PETg at 50% weight ratio each. The packets were designed so that each of the first and second packets was a reflective polarizer.

Table 1 shows the white and dark luminance of polarizers discussed above are shown relative to a conventional iodine polarizer (Sanritz-5618). Also shown is single pass transmission for the pass and block state of each film. These data were measured with a PR705 SpectraScan® spectroradiometer (Photo Research, Inc., Chatsworth, Calif.) in an LG 23 inch (58 cm) monitor and with a Lambda 1050 spectrophotometer (Perkin-Elmer, Waltham, Mass.).

TABLE 1

| Polarizer | White Luminance (relative %) | Dark Luminance (relative %) | Contrast Ratio (relative %) | Avg. T % Block 450-650 nm | Avg. T % Pass 450-650 nm |
|---|---|---|---|---|---|
| Sanritz-5618 | 100 | 100 | 100 | 0.03 | 82.1 |
| Comparative Example C1 | 134 | 340 | 39 | 0.12 | 62.3 |
| Comparative | 107 | 174 | 59 | 0.09 | 52.8 |

TABLE 1-continued

| Polarizer | White Luminance (relative %) | Dark Luminance (relative %) | Contrast Ratio (relative %) | Avg. T % Block 450-650 nm | Avg. T % Pass 450-650 nm |
|---|---|---|---|---|---|
| Example C2 Comparative Example C3 | 79 | 196 | 22 | 0.05 | 54.4 |

Comparative Example C4

A hybrid polarizer having a structure similar to that of Comparative Example C1 was manufactured using the feedblock method described in U.S. Patent Application Publication No. 2011/0272849 entitled "Feedblock for Manufacturing Multilayer Polymeric Films", filed May 7, 2010. Two packets of alternating low and high index polymer layers were coextruded as a cast web and then stretched in a tenter on a continuous film making line. The first packet and the second packet were each a stack of 325 layers where the high index layer was constrained uniaxial PEN and the low index layer was GN071 PETg. The packets were designed so that each of the first and second packets was a reflective polarizer. Absorbing polarizer layers were coextruded on the outer surface of the first packet and in between the first and second packets with the following method. PEN pellets were fed into a twin screw extruder at a rate of 40.8 kg/hr (90 pph). Dichroic dyes purchased were also fed into the twin screw extruder at the following rates: PD-104: 37.7 g/hr (0.08 pph), PD-325H: 97.8 g/hr (0.21 pph), PD-335H: 16.1 g/hr (0.04 pph), and PD-318H: 156.2 g/hr (0.34 pph). This mixture was fed through a 41 cm (16 inch) die along with the multilayer packets to form a cast sheet at a speed of 6.5 m/min (21.3 feet per minute). The cast sheet was stretched in a tenter at a ratio of 5.6:1 at a temperature of 146° C. (295° F.) with a speed of 6.5 m/min (21.3 feet per minute).

Comparative Example C5

A hybrid polarizer similar to that in shown FIG. 1 was made. The hybrid polarizer was manufactured as described in Comparative Example C1 except that no absorbing layer was extruded on the outer surface. Two packets of alternating low and high index polymer layers were coextruded as a cast web and then stretched in a tenter on a continuous film making line. The first packet and the second packet were each a stack of 325 layers where the high index layer was constrained uniaxial PEN and the low index layer was GN071 PETg. The packets were designed so that each of the first and second packets was a reflective polarizer. An absorbing polarizer layer was coextruded in between the first and second packets with the following method. PEN pellets were fed into a twin screw extruder at a rate of 40.8 kg/hr (48 pph). Dichroic dyes purchased were also fed into the twin screw extruder at the following rates: PD-104: 23 g/hr (0.05 pph), PD-325H: 73 g/hr (0.16 pph), PD-335H: 4 g/hr (0.009 pph), and PD-318H: 124 g/hr (0.27 pph).

Example 1

A hybrid polarizer was manufactured using the feedblock method described in U.S. Patent Application Publication No. 2011/0272849 entitled "Feedblock for Manufacturing Multilayer Polymeric Films", filed May 7, 2010. Two packets of alternating low and high index polymer layers were coextruded as a cast web and then stretched in a tenter on a continuous film making line. The first packet and the second packet were each a stack of 325 layers. In the hybrid polarizer packet, the high index layer was constrained uniaxial PEN fed into the twin screw extruder at a rate of 15.21 kg/hr with dichroic dyes fed at the following rates: PD-104: 7.8 g/hr (0.02 pph), PD-325H: 20.3 g/hr (0.04 pph), PD-335H: 3.3 g/hr (0.01 pph), and PD-318H: 32.5 g/hr (0.07 pph). The low index layer was GN071 PETg. The reflective polarizer packet was made with PEN as a high index resin and GN071 PETg as a low index resin. An absorbing polarizer layer was extruded in between the hybrid polarizer and reflective polarizer packets with PEN at a rate of 32 kg/hr (70.8 pph) and dichroic dyes at the following rates: PD-104: 29.3 g/hr (0.06 pph), PD-325H: 76.2 g/hr (0.17 pph), PD-335H: 12.5 g/hr (0.03 pph), and PD-318H: 121.7 g/hr (0.27 pph). This mixture was fed through a 41 cm (16 inch) die along with the multilayer packets to form a cast sheet at a speed of 6.5 m/min (18.5 feet per minute). The cast sheet was stretched in a tenter at a ratio of 5.6:1 at a temperature of 146° C. (295° F.) with a speed of 6.5 m/min (18.5 feet per minute).

Luminance data was collected as described in Comparative Example C3. Table 2 shows the on-axis white and dark luminance for Example 1 and comparative polarizers. For Example 1, the white luminance was similar, the dark luminance was lower, and contrast ratio was higher compared to Comparative Example C1.

TABLE 2

| Polarizer | White Luminance (relative %) | Dark Luminance (relative %) | Contrast Ratio (relative %) |
| --- | --- | --- | --- |
| Sanritz-5618 | 100 | 100 | 100 |
| Comparative Example C1 | 134 | 340 | 39 |
| Comparative Example C4 | 123 | 158 | 78 |
| Comparative Example C5 | 135 | 213 | 63 |
| Example 1 | 125 | 167 | 76 |

The polarizers of Comparative Example C1 and Example 1 were tested in various displays. Conoscopic data were measured using an Autronic ConoScope ConoStage 3 (available from Autronic-Melchers GmbH, Karlsruhe, Germany). In some displays, light leakage was seen along the principal axis of the polarizer of Comparative Example C1. The highest light leakage occurred in between the principal axes of the polarizers, generally around 60 degrees viewing angle. In some cases light leakage in the dark state around 50 degrees in the vertical viewing direction was observed. At this location, bright, rainbow-like colors, which are undesirable for a display, were observed. Also, increased dark state luminance occurred along the 45 and 135 degree azimuthal directions at 60 to 80 degrees viewing angle. Such sharp changes in luminance are undesirable. Comparative Examples C4 and C5 showed similar undesirable effects.

Figure 3:
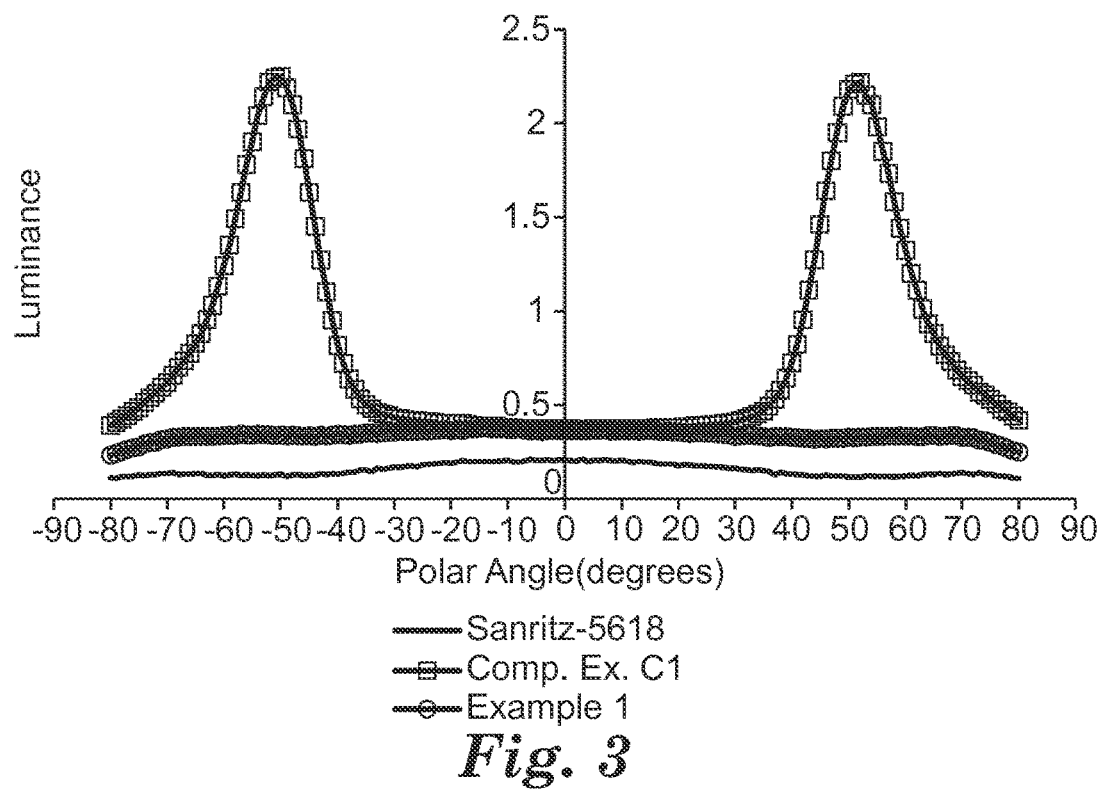
FIG. 3 is a graph showing 90° luminance cross sections for an exemplary hybrid polarizer and two comparative polarizers.

In comparison, it was found that the polarizer of Example 1 removed these undesirable retardance effects. In FIG. 3, the 90 degree luminance cross section data for a display incorporating the polarizer of Comparative Example C1, a display incorporating a Sanritz-5618 polarizer, and a display incorporating the polarizer of Example 1 are shown.

Figure 4:
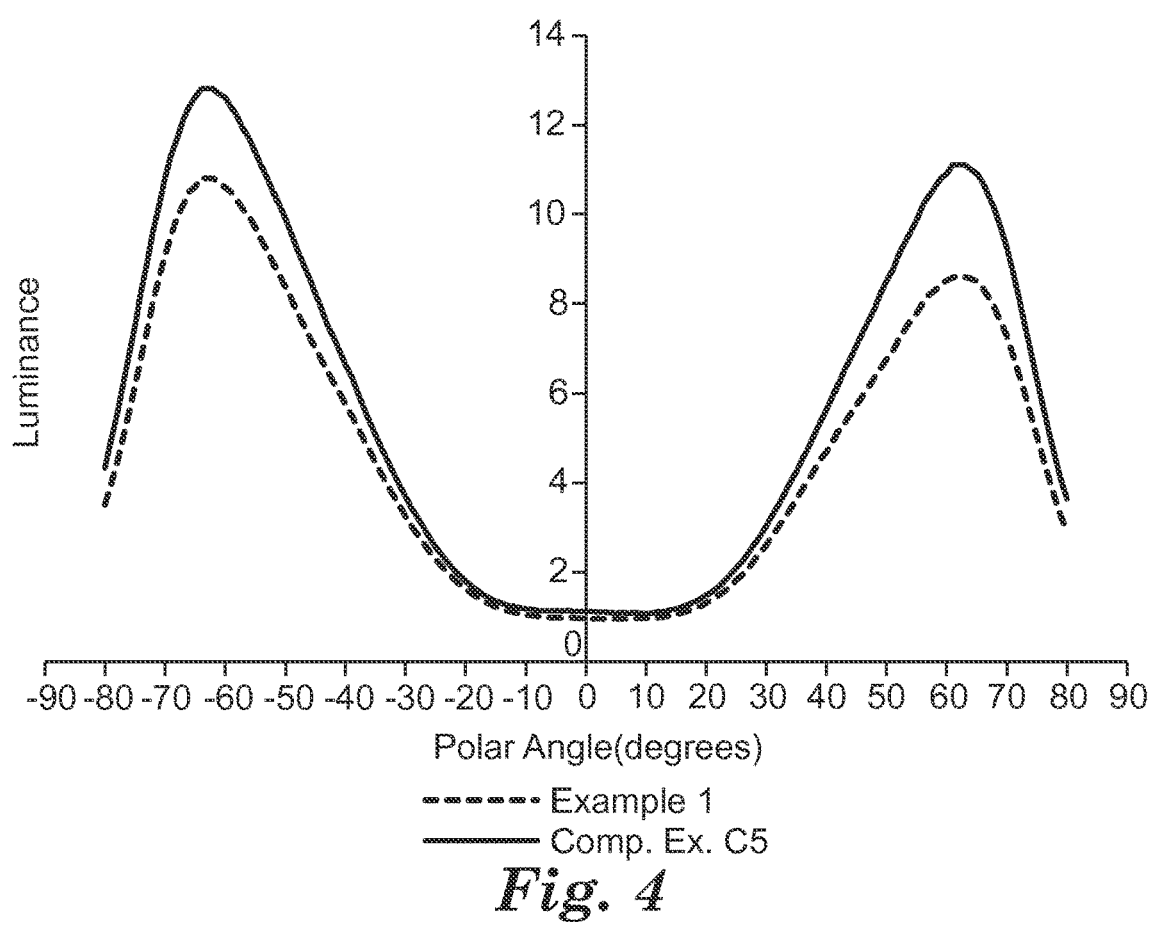
FIG. 4 is a graph showing 135° luminance cross sections for an exemplary hybrid polarizer and a comparative polarizer.

FIG. 4 shows the dark state light leakage at high viewing angle (135° azimuthal angle) for Example 1 and Comparative Example C5. It was also observed that the polarizer of Comparative Example C4 showed increased luminance in the off-axis dark state compared to Example 1. The results indicate that the absorbing polarizer elements in the embedded absorber MOF of Example 1 act as an anti-reflection layer for the viewing side ambient light and also act as a clean-up polarizer to reduce high angle light leakage.

The following are exemplary embodiment according to the present disclosure:

Item 1. A hybrid polarizer, comprising:
 a reflective polarizer portion, including alternating high index layers and low index layers, wherein the reflective polarizer portion is substantially free of absorbing polarizer elements; and
 a hybrid polarizer portion disposed on the reflective polarizer portion, including alternating high index layers and low index layers, wherein at least some of the high index layers of the hybrid polarizer portion include absorbing polarizer elements.

Item 2. The hybrid polarizer of item 1, wherein each of the high index layers of the hybrid polarizer portion includes absorbing polarizer elements.

Item 3. The hybrid polarizer of item 1 or 2, wherein the absorbing polarizer elements are dyes.

Item 4. The hybrid polarizer of item 3, wherein the dyes are polarizing dyes.

Item 5. The hybrid polarizer of item 1, further comprising an absorbing polarizer disposed on the hybrid polarizer portion.

Item 6. The hybrid polarizer of item 1, further comprising a quarter-wave plate disposed on either the hybrid polarizer portion or the reflective polarizer portion.

Item 7. The hybrid polarizer of item 1, wherein the reflective polarizer portion and the hybrid polarizer portion have substantially equal thicknesses.

Item 8. The hybrid polarizer of item 1, wherein the hybrid polarizer contains no layer thicker than 200 nm.

Item 9. The hybrid polarizer of item 1, wherein the reflective polarizer portion and the hybrid polarizer portion are separate packets.

Item 10. The hybrid polarizer of item 4, wherein the reflective polarizer portion and the hybrid polarizer portion are separated by a protective boundary layer.

Item 11. The hybrid polarizer of item 1, wherein the reflective polarizer portion and the hybrid polarizer portion include thermoplastic layers.

Item 12. A hybrid polarizer, comprising:
 a reflective polarizer portion, including alternating high index layers and low index layers, wherein the reflective polarizer portion is substantially free of absorbing polarizer elements;
 an absorbing polarizer disposed on the reflective polarizer portion; and
 a hybrid polarizer portion disposed on the absorbing polarizer, including alternating high index layers and low index layers, wherein at least some of the high index layers of the hybrid polarizer portion include absorbing polarizer elements.

Item 13. A backlight having a viewing area, the backlight comprising the hybrid polarizer of either item 1 or 12, wherein the hybrid polarizer is disposed such that the hybrid polarizer portion is closer to the viewing area than the reflective polarizer portion.

Descriptions for elements in figures should be understood to apply equally to corresponding elements in other figures, unless indicated otherwise. The present invention should not be considered limited to the particular embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. A hybrid polarizer, comprising:
   a reflective polarizer portion, including alternating high index layers and low index layers, wherein the reflective polarizer portion is substantially free of absorbing polarizer elements; and
   a quarterwave stack of alternating high index layers and low index layers directly adhered to the reflective polarizer, wherein none of the high index nor low index layers are thicker than 200 nm, wherein each of the high index layers of the stack include absorbing polarizer dyes.

2. The hybrid polarizer of claim 1, further comprising an absorbing polarizer disposed on a quarterwave stack side opposite from the reflective polarizer portion.

3. The hybrid polarizer of claim 1, further comprising a quarter-wave plate disposed on either the quarterwave stack or the reflective polarizer portion.

4. The hybrid polarizer of claim 1, wherein the reflective polarizer portion and the quarterwave stack have substantially equal thicknesses.

5. The hybrid polarizer of claim 1, wherein the reflective polarizer portion and the quarterwave stack are separate packets.

6. The hybrid polarizer of claim 1, wherein the reflective polarizer portion and the quarterwave stack include thermoplastic layers.

7. A hybrid polarizer, comprising: a reflective polarizer portion, including alternating high index layers and low index layers, wherein the reflective polarizer portion is substantially free of absorbing polarizer elements; and a stack of alternating high index layers and low index layers directly adhered to the reflective polarizer, wherein none of the high index nor low index layers are thicker than 200 nm, wherein each of the high index layers of the stack include absorbing polarizer dyes.

8. A hybrid polarizer, comprising:
   a reflective polarizer portion, including alternating high index layers and low index layers, wherein the reflective polarizer portion is substantially free of absorbing polarizer elements; and
   a stack of alternating high index layers and low index layers directly adhered to the reflective polarizer, wherein none of the high index nor low index layers are thicker than 200 nm, wherein each of the high index layers of the stack include absorbing polarizer dyes, and where each adjacent pair of low index layer and high index layer forms an optical repeat unit.

* * * * *